United States Patent
Tu et al.

(10) Patent No.: US 9,656,241 B2
(45) Date of Patent: May 23, 2017

(54) 5A MOLECULAR SIEVE ADSORBENT AND METHOD FOR PREPARATION OF THE SAME

(71) Applicant: CHINA PETROLEUM & CHEMICAL CORPORATION, Beijing (CN)

(72) Inventors: Changzhi Tu, Beijing (CN); Shihua Chen, Beijing (CN); Yunlong Ding, Beijing (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 644 days.

(21) Appl. No.: 14/064,731

(22) Filed: Oct. 28, 2013

(65) Prior Publication Data
US 2015/0018196 A1 Jan. 15, 2015

(30) Foreign Application Priority Data
Oct. 29, 2012 (CN) .......................... 2012 1 0421121

(51) Int. Cl.
| | | |
|---|---|---|
| B01J 29/06 | (2006.01) | |
| B01J 20/18 | (2006.01) | |
| B01J 20/30 | (2006.01) | |
| B01J 29/70 | (2006.01) | |
| B01J 20/28 | (2006.01) | |
| B01J 35/02 | (2006.01) | |
| B01J 37/00 | (2006.01) | |
| B01J 35/10 | (2006.01) | |

(52) U.S. Cl.
CPC ........... *B01J 20/3071* (2013.01); *B01J 20/18* (2013.01); *B01J 20/183* (2013.01); *B01J 20/28004* (2013.01); *B01J 20/28011* (2013.01); *B01J 20/28019* (2013.01); *B01J 20/28071* (2013.01); *B01J 20/3042* (2013.01); *B01J 29/7003* (2013.01); *B01J 35/023* (2013.01); *B01J 35/1038* (2013.01); *B01J 37/0009* (2013.01)

(58) Field of Classification Search
USPC ............................ 502/60, 400, 407, 411, 414
See application file for complete search history.

(56) References Cited

U.S. PATENT DOCUMENTS

| | | | |
|---|---|---|---|
| 4,950,312 A | 8/1990 | Puppe et al. | |
| 2006/0236862 A1* | 10/2006 | Golden | ............. B01D 53/0473 95/96 |
| 2008/0241035 A1* | 10/2008 | Hirano | ................... B01D 53/02 423/240 R |
| 2011/0105301 A1 | 5/2011 | Wang et al. | |

FOREIGN PATENT DOCUMENTS

| | | |
|---|---|---|
| CN | 87105499 A | 9/1988 |
| CN | 1248487 A | 3/2000 |
| CN | 1261201 C | 6/2006 |
| CN | 102451664 A | 5/2012 |
| CN | 102464324 A | 5/2012 |
| WO | 2012024896 A1 | 3/2012 |

OTHER PUBLICATIONS

Translation of CN 87105499 A, Sep. 21, 1988.*
Marc P.F. Delmas et al. "Measurement of diffusion in small 5A zeolite crystals using a wall-coated capillary column", Zeolites, 1995, vol. 15, No. 1, pp. 45-50.

* cited by examiner

*Primary Examiner* — Elizabeth Wood
(74) *Attorney, Agent, or Firm* — Novick, Kim & Lee, PLLC; Allen Xue

(57) ABSTRACT

The present invention provides an adsorbent and a method for preparation of the adsorbent, wherein, the average crystal grain diameter of 5A molecular sieves in the adsorbent is 0.2-2.1 μm; measured on the basis of the dry weight of the adsorbent, the content of 5A molecular sieves in the adsorbent is 92 wt. % or higher; the breaking ratio of the adsorbent at 250N is 9% or lower. The method for preparation of the adsorbent comprises: processing a powder material that contains 4A molecular sieves and a binder source by roll forming to obtain beads; drying and calcining the beads to obtain matrix beads; pre-wetting the matrix beads and then processing the matrix beads by crystal transformation so that the binder in the matrix beads is essentially transformed into 4A molecular sieves, to obtain 4A molecular sieve beads; washing the 4A molecular sieve beads with water and then processing the 4A molecular sieve beads by calcium exchange to obtain 5A molecular sieve beads; washing the 5A molecular sieve beads with water and then drying and calcining the 5A molecular sieve beads. The adsorbent provided in the present invention has advantages such as high adsorptive capacity and adsorption efficiency for n-alkanes and high strength.

20 Claims, No Drawings

5A MOLECULAR SIEVE ADSORBENT AND METHOD FOR PREPARATION OF THE SAME

CROSS REFERENCE TO RELATED APPLICATIONS

This application claims the priority to Chinese Application No. 201210421121.4, filed on Oct. 29, 2012, entitled "5A Molecular Sieve Adsorbent and Method for Preparation of the Same and the Use of the same" which is specifically and entirely incorporated by reference.

FIELD OF THE INVENTION

The present invention relates to a 5A molecular sieve adsorbent and a method for preparation of the 5A molecular sieve adsorbent.

BACKGROUND OF THE INVENTION

In petroleum products, n-alkanes have molecular diameter smaller than 5A, while isoalkanes, cycloalkanes, and aromatics have molecular diameter greater than 5A. According to the adsorption characteristic of molecular sieves, n-alkanes can be separated and absorbed from petroleum products with 5A molecular sieves as the adsorbent. Presently, the separation technique for separating n-alkanes from petroleum products mainly used by abroad industrial installations is the Molex molecular sieve dewaxing process developed by UOP company (USA), and the molecular sieve dewaxing adsorbents used mainly are ADS-12, ADS-14, and ADS-34 series products from UOP Company.

The NWA-IIB molecular sieve adsorbent from SINOPEC Catalyst (Nanjing) is developed with independently developed techniques by spraying silica beads first, and then performing in-situ crystallization and exchange to synthesize 5A bead adsorbent. That process has advantages such as free of binder, high molecular sieve content, small crystal grain size, high strength, and continuous production, etc., but has disadvantages such as long process, low yield of silica beads, oily waste water with high ammonia nitrogen content, high product cost, and unmodifiable properties, etc.

The Chinese patent document CN87105499A has disclosed a method for preparation of binder-free spherical type A molecular sieve, which prepares silica hydrogel beads from inorganic ammonium salt, inorganic acid, and sodium silicate through an oil column forming process, produces low-density loose silica beads through water washing, surfactant impregnation, drying, and calcination, mixes the silica beads with sodium metaaluminate solution, performs aging and crystallization at specific temperature so that the silica are essentially transformed into 4A molecular sieves, and then turn the 4A molecular sieves into 5A molecular sieves through calcium exchange. The process brings two major pollutants in the production process, and the pollutants are difficult to treat; especially, the use of inorganic ammonium salt results in ammonia nitrogen waste water that is difficult to treat, and the use of surfactant causes COD out-of-specification of the waste water.

SUMMARY OF THE INVENTION

The object of the present invention is to provide a 5A molecular sieve adsorbent product that has high molecular sieve content, high strength, and high adsorptive capacity, and a method for preparation of the 5A molecular sieve adsorbent.

To achieve the object described above, in a first aspect of the present invention, the present invention provides a 5A molecular sieve adsorbent, wherein, the average crystal grain diameter of the 5A molecular sieves in the adsorbent is 0.2-2.1 µm; measured on the basis of the dry weight of the adsorbent, the content of 5A molecular sieves in the adsorbent is 92 wt. % or higher; the breaking ratio of the adsorbent at 250N is 9% or lower.

In a second aspect of the present invention, the present invention provides a method for preparation of 5A molecular sieve adsorbent, comprising:

(1) processing a powder material that contains 4A molecular sieves and a binder source by roll forming to obtain beads; drying and calcining the beads to obtain matrix beads;

(2) pre-wetting the matrix beads, and then performing crystal transformation so that the binder in the matrix beads is essentially transformed into 4A molecular sieves, to obtain 4A molecular sieve beads;

(3) washing the 4A molecular sieve beads with water, and then performing calcium exchange to obtain 5A molecular sieve beads; washing the 5A molecular sieve beads with water and then drying and calcining the beads.

In a third aspect of the present invention, the present invention provides a 5A molecular sieve adsorbent obtained with the preparation method disclosed in the present invention.

The 5A molecular sieve adsorbent provided in the present invention has advantages such as high 5A molecular sieve content, small crystal grain size of 5A molecular sieves and high pore volume; therefore, the 5A molecular sieve adsorbent has advantages including high adsorptive capacity and adsorption efficiency for n-alkanes and high strength, etc.

In the present invention, a powder material that contains 4A molecular sieves and a binder source is processed by roll forming and then dried and calcined to obtain matrix beads; then, the matrix beads are pre-wetted and then processed by crystal transformation, calcium exchange, drying, and calcination; thus, the 5A molecular sieve adsorbent obtained with the preparation method disclosed in the present invention has advantages such as high adsorptive capacity and adsorption efficiency for n-alkanes (e.g., n-hexane) and high strength. Moreover, the technical process of the method disclosed in the present invention is simple, and no surfactant is required and no ammonia nitrogen waste water is produced in the preparation process; therefore, clean production is achieved effectively. Thus it can be seen that the method disclosed in the present invention is very suitable for use in industrial applications.

Other characteristics and advantages of the present invention will be further detailed in the embodiments hereunder.

DETAILED DESCRIPTION OF THE EMBODIMENTS

Hereunder the embodiments of the present invention will be detailed. It should be appreciated that the embodiments described here are only provided to describe and explain the present invention, but shall not be deemed as constituting any limitation to the present invention.

The present invention provides a 5A molecular sieve adsorbent, wherein, the average crystal grain diameter of the 5A molecular sieves in the adsorbent is 0.2-2.1 µm; measured on the basis of the dry weight of the adsorbent, the content of 5A molecular sieves in the adsorbent is 92 wt. % or higher; the breaking ratio of the adsorbent at 250N is 9% or lower.

In a preferred embodiment of the present invention, to further improve the adsorptive capacity of the adsorbent, preferably the average crystal grain diameter of the 5A molecular sieves is 0.5-1.5 µm; measured on the basis of the dry weight of the adsorbent, the content of the 5A molecular sieves in the adsorbent is 95 wt. % or higher; the breaking ratio of the adsorbent at 250N is 4-7%, preferably 6-7%.

In the present invention, measured on the basis of the dry weight, the rest part of the adsorbent is binder and/or pore former, except for the 5A molecular sieves. There is no special requirement for the moisture content in the adsorbent, which is to say, any adsorbent with normal moisture content can be used in the present invention; specifically, for the present invention, measured on the basis of the total weight of the adsorbent, the moisture content in the adsorbent is 5 wt. % or less.

In a more preferred embodiment of the present invention, to further improve the adsorptive capacity of the adsorbent, preferably the average crystal grain diameter of the 5A molecular sieves is 0.6-1.4 µm; measured on the basis of the dry weight of the adsorbent, the content of the binder and/or pore former is 1-4 wt. %, and the content of the 5A molecular sieves is 96-99 wt. %.

In a preferred embodiment of the present invention, preferably the adsorbent is in the form of spherical beads; more preferably the diameter of the spherical beads is 0.1-1.6 mm, even more preferably 0.3-1.3 mm By utilizing the spherical beads adsorbent described above as the adsorbent, in conjunction with the above technical scheme of the present invention, the adsorptive capacity of the adsorbent can be improved greatly.

In a preferred embodiment of the present invention, preferably the total pore volume of the adsorbent is 0.28 cm$^3$/g or greater, more preferably 0.29 cm$^3$/g or greater, even more preferably 0.29-0.35 cm$^3$/g. By utilizing the adsorbent with the preferred total pore volume described above as the adsorbent, in conjunction with the above technical scheme of the present invention, the adsorptive capacity of the adsorbent can be improved greatly.

In a preferred embodiment of the present invention, preferably the adsorptive capacity for n-hexane is 120 mg/g or higher, preferably 130 mg/g or higher, more preferably 130-140 mg/g.

An adsorbent with the aforesaid technical features prepared with any method for preparation can achieve the objects of the present invention; for example, to prepare a spherical bead adsorbent, roll forming, drip forming, or mold forming technique can be used; specifically, for the present invention, roll forming is preferred, and the adsorbent provided in the present invention can be prepared through the following steps:

(1) process a powder material that contains 4A molecular sieves and a binder source by roll forming to obtain beads; dry and calcine the beads to obtain matrix beads;

(2) pre-wet the matrix beads, and then perform crystal transformation so that the binder in the matrix beads is essentially transformed into 4A molecular sieves, to obtain 4A molecular sieve beads;

(3) wash the 4A molecular sieve beads with water, and then perform calcium exchange to obtain 5A molecular sieve beads; wash the 5A molecular sieve beads with water and then dry and calcine the beads.

In the present invention, the crystal transformation is a crystal transformation technique well known by those skilled in the art; specifically, it refers to treat the matrix beads that contain a binder with alkali, so that the binder is transformed into 4A molecular sieves.

The object of the present invention can be achieved with any technical scheme described above with the method provided in the present invention; specifically, for the present invention, to further improve the adsorptive capacity for n-alkanes of the obtained 5A molecular sieve adsorbent, preferably the average crystal grain diameter of the 4A molecular sieves in step (1) is 0.2-2.1 µm, preferably 0.5-1.5 µm, more preferably 0.6-1.4 µm. By utilizing the 4A molecular sieves with the average crystal grain diameter described above to prepare the 5A molecular sieve adsorbent in the present invention, the adsorptive capacity for n-alkanes of the obtained 5A molecular sieve adsorbent can be improved.

In the method disclosed in the present invention, preferably the adsorptive capacity for methanol of the 4A molecular sieves in step (1) is 160-190 mg/g, more preferably 180-190 mg/g.

With the method disclosed in the present invention, the object of the present invention can be achieved as long as the matrix beads are pre-wetted before crystal transformation; specifically, for the present invention, to further improve the adsorptive capacity for n-alkanes of the obtained 5A molecular sieve adsorbent, preferably conditions for pre-wetting the matrix bead in step (2) ensure the moisture content in the pre-wetted matrix beads is 15 wt. % or higher, preferably 18-22 wt. %.

In the method disclosed in the present invention, there is no special requirement for the pre-wetting method, as long as the moisture content in the pre-wetted matrix beads is 15 wt. % or higher, which is to say, any pre-wetting method in the prior art can be used for the present invention; specifically, for the present invention, preferably the pre-wetting procedure in step (2) is carried out through the following steps: keep the matrix beads in a humid environment for 1-10 h, wherein, the humidity of the humid environment is preferably 10-100% RH, more preferably 60-80% RH, where, RH refers to relative humidity, i.e., the percentage of water vapor contained in the environment air to saturated water vapor in the air under the same conditions.

In the method disclosed in the present invention, preferably the powder material that contains 4A molecular sieves and a binder source in step (1) further contains auxiliary agents (e.g., pore former); preferably the pore former is one or more of lignin, sodium carboxymethyl cellulose, and sesbania powder. By adding a pore former into the powder material, the bulk density of the 5A molecular sieve adsorbent can be adjusted.

In the method disclosed in the present invention, the content of 4A molecular sieves and the content of binder source in the powder material can be selected in a wide range, and can be determined with reference to the prior art; specifically, for the present invention, in a preferred embodiment of the present invention, in the powder material, the content of 4A molecular sieves is 90-99 wt. %, the content of binder source is 0.5-9 wt. %, and the content of pore former is 0.1-8 wt. %.

In the present invention, the method for preparation of the powder material that contains 4A molecular sieves and a binder source (or may further contains auxiliary agents) can be determined with reference to the prior art; for example, 4A molecular sieve powder, binder powder, and auxiliary agent powder can be mixed in a mixer (e.g., twin-screw mixer) for 1-5 h. Such a preparation method is well known by those skilled in the art, and will not be detailed any more here.

In the present invention, the roll forming procedure of the powder material that contains 4A molecular sieves and a binder source can be carried out with reference to the prior art; for example, the roll forming procedure can be carried out through the following steps: loading the powder material that contains 4A molecular sieves and a binder source (or may further contains auxiliary agents) into a bowl pot (e.g., a sugar coating pot, preferably the caliber of the bowl pot is 0.5-2.5 m, more preferably 1.0-1.2 m), and then add water while carrying out roll forming, wherein, preferably the working conditions in the bowl pot include: rotation speed: 30-40 rpm, water adding rate: ensures the moisture content in the rolled material is increased by 3-5 wt. % per hour; stop adding water when the moisture content in the rolled material reaches 45-50 wt. %, and then continue roll forming for 3-5 h. Specifically, for the present invention, preferably conditions for the roll forming ensure the diameter of the obtained beads is 0.3-0.9 mm and the moisture content in the beads is 42-44 wt. %.

In the method disclosed in the present invention, the type of the binder source can be selected in a wide range, and any binder in a binder source that can be transformed into 4A molecular sieves by crystal transformation can be used for the present invention (e.g., clay and/or silica-alumina gel); specifically, for the present invention, preferably the binder source in step (1) is one or more of Kaolin, sodium metaluminate, Yangkan clay, and diatomite.

In the method disclosed in the present invention, the method for drying the 5A molecular sieve beads in step (3) can be determined with reference to the prior art. However, the inventor has found in the research process: if microwave drying is used for the 5A molecular sieve beads, the adsorptive capacity for n-alkanes of the finally obtained 5A molecular sieve adsorbent can be improved greatly. Therefore, for the present invention, preferably after water washing, the 5A molecular sieve beads in step (3) are dried by microwave; preferably, the conditions for microwave drying ensure the moisture content in the dried 5A molecular sieve beads is 18 wt. % or lower.

In the method disclosed in the present invention, the microwave drying method is well known by those skilled in the art, and will not be detailed any more here. For the present invention, preferably conditions for the microwave drying for the 5A molecular sieve beads in step (3) include: the power of microwave oven is 100-500 KW, preferably 250-400 KW; clean air is used in the process to carry away a great deal of water vapor produced during microwave heating, and the clean air flow is controlled at 100-1000 m$^3$/h, preferably 600-800 m$^3$/h; for example, the clean air can be air; preferably the clean air is air with dew point controlled within 50° C.-50° C. range, preferably 20° C.-30° C. range.

In the method disclosed in the present invention, the method for calcining the 5A molecular sieve beads in step (3) can be determined with reference to the prior art. However, the inventor has found in the research process: if the 4A molecular sieve beads are calcined in flowing state under specific clean air pressure, the bleeding water can be carried away quickly in the calcination process of the 5A molecular sieve beads, and thereby the damage of high-temperature water vapor to 5A molecular sieve structure can be avoided effectively. Therefore, for the present invention, preferably the 5A molecular sieve beads is calcined in flowing state under 1-5 MPa pressure of clean air for dehydration; more preferably, the conditions for calcinations ensure the moisture content in the calcined 5A molecular sieve beads is 5 wt. % or lower. For the present invention, preferably the calcination conditions include: calcination in flowing state, and the calcination temperature is 500-600° C., preferably 550-570° C.; the pressure of clean air during calcination is 1-5 MPa, preferably 2-3 MPa; the calcination time is 1-5 h, preferably 2-3 h. As described above, the clean air can be air; preferably the clean air is air with dew point controlled within 50° C.-50° C. range, preferably 20° C.-30° C. range.

The calcining equipment that can meet the conditions for calcination described above can be a vertical furnace, for example.

In the method disclosed in the present invention, there is no special requirement for the operational conditions of the vertical furnace, as long as the operational conditions ensure the object of the present invention can be attained. Specifically, for the present invention, the volume of the vertical furnace is preferably 0.1-10 m$^3$, more preferably 1-1.8 m$^3$; the height-diameter ratio of the vertical furnace is preferably 0.1-10:1, more preferably 0.5-2:1. Furthermore, the clean air flow in the vertical furnace is preferably controlled at 100-3,000 m$^3$/h, more preferably 1,600-2,000 m$^3$/h. As described above, the clean air can be air; preferably the clean air is air with dew point controlled within 50° C.-50° C. range, preferably 20° C.-30° C. range.

In the method disclosed in the present invention, the crystal transformation method for the matrix beads in step (2) after pre-wetting can be selected with reference to the prior art, and any crystal transformation method in the prior art can be used for the present invention. Specifically, for the present invention, preferably the conditions for crystal transformation of the matrix beads in step (2) after pre-wetting ensure 80 wt. % or more binder in the matrix beads is transformed into 4A molecular sieves.

For the present invention, more preferably, the crystal transformation procedure is carried out through the following steps: controlling the pre-wetted matrix beads to contact with sodium hydroxide solution; preferably the contact conditions include: concentration of sodium hydroxide solution: 0.1-0.25 mol/L, preferably 0.13-0.15 mol/L; volume ratio of sodium hydroxide solution to pre-wetted matrix beads: 1-9:1, preferably 2-3:1; contact temperature: 50-150° C., preferably 95-100° C.; contact time: 1-6 h, preferably 2-3 h.

In the method disclosed in the present invention, the calcium exchange in step (3) can be carried out with reference to the prior art, and any calcium exchange method in the prior art can be used for the present invention; specifically, for the present invention, preferably the calcium exchange in step (3) is carried out through the following steps: controlling the water-washed 4A molecular sieve beads to contact with the calcium chloride solution; preferably the contact conditions include: concentration of calcium chloride solution being of 0.1-1.2 mol/L, preferably 0.5-0.6 mol/L; volume ratio of calcium chloride solution to water-washed 4A molecular sieve being of 1-9:1, preferably 2-3:1; contact temperature being of 50-150° C., preferably 95-99° C.; contact time being of 1-16 h, preferably 3-5 h.

In the method disclosed in the present invention, there is no special requirement for the container used for calcium exchange; for example, the calcium exchange can be carried out in a kettle-type container or column-type container; specifically, for the present invention, the calcium exchange is preferably carried out in a column-type container.

Depending on the requirement, the method disclosed in the present invention can further comprises reshaping treatment (usually also referred to as polishing treatment in the art) of the beads obtained in step (1), before the beads are dried.

In the present invention, the reshaping (also referred to as polishing) refers to: load the beads into a shaping machine, start up the machine, and rub, blow, extrude, and burnish the beams in the shaping machine, so that the interior of the beads becomes denser and the surface of the beads becomes smoother. Specifically, the reshaping can be implemented with the following method: loading a specific quantity of beads into a shaping machine, starting up and operating the shaping machine at a low speed first, and then operating the shaping machine at a high speed after the pretreatment of the beads. That method is well known by those skilled in the art, and will not be detailed any more here.

In the present invention, the drying method and calcination method in step (1) can be selected with reference to the prior art, wherein, the drying can be carried out with the microwave drying method described above, and the calcination can be carried out by calcination in a vertical furnace as described above.

In the present invention, the purpose of water washing of the 4A molecular sieve beads in step (3) is mainly to remove free sodium ions by water washing; whereas the purpose of water washing of 5A molecular sieve beads is mainly to remove chloride ions by water washing. The water washing treatment is well known by those skilled in the art, and will not be detailed any more here and will not be emphasized in the embodiments of the present invention.

The present invention provides a 5A molecular sieve adsorbent prepared with the preparation method disclosed in the present invention.

The adsorptive capacity for n-hexane of the 5A molecular sieve adsorbent prepared with the method disclosed in the present invention is 120 mg/g or higher, preferably 130 mg/g or higher, more preferably 130-140 mg/g.

In the present invention, the ignition loss of the 5A molecular sieve adsorbent at 580° C. is 5 wt. % or lower, preferably 2-4 wt. %.

In the present invention, the moisture content in the 5A molecular sieve adsorbent is expressed by the ignition loss after 1.5 h ignition at 580° C., i.e., the ratio of the lost mass of the 5A molecular sieve adsorbent after ignition to the mass of the 5A molecular sieve adsorbent before ignition.

In the present invention, the bead diameter of the 5A molecular sieve adsorbent is preferably 0.2-1.5 mm, more preferably 0.3-0.9 mm.

In the present invention, the adsorptive capacity for n-hexane is measured as the industry standard Q/SH349551.

In the present invention, the calcium exchange ratio refers to the percentage of sodium ions replaced by calcium ion in the molecular sieves, and is measured with the method defined in the industry standard Q/SH349550.

In the present invention, the average crystal grain diameter is measured with SEM method.

In the present invention, the adsorbent strength is measured with the method disclosed in chinese patent CN1261201C, and is expressed by the breaking ratio at 250N pressure. The lower the breaking ratio is, the higher the strength is.

The molecular sieve content in the adsorbent is measured with the measurement method defined in ASTM D5357-2003(2008)e1.

The spherical bead diameter is measured with vernier calipers and read directly. The total pore volume is measured with the measurement method defined in GB/T5816-1995.

Example 1

(1) Take 400 kg milled commercial 4A molecular sieve powder (21 wt. % moisture content, 0.7 μm average crystal grain diameter, and 181 mg/g adsorptive capacity for methanol), 20 kg kaolin (moisture content: 22 wt. %), and 10 kg sesbania powder pore former, load them into a twin-screw mixer and mix for 3 h, take out 50 kg mixed material and load it into a bowl pot (sugar coating pot) with 1.2 m caliber, carry out roll forming to produce beads (the working conditions in the bowl pot include: the rotation speed is controlled at 30 rpm, the water adding rate ensures the moisture content in the material is increased by 3-5 wt. % per hour; stop adding water when the moisture content in the material reaches 45-50 wt. %, and then keep the rotation speed of the bowl pot at 30-40 rpm and operate for 3-5 h); carry out polishing treatment for 1-2 h after the ball diameter reaches 0.3-1.0 mm, and then sieve the material to obtain bead samples, produce beads by roll forming in 20 identical bowl pots with that method, and obtain 1 ton beads finally (43 wt. % moisture content, and 0.3-0.9 mm diameter);

Treat the beads by microwave drying (the drying conditions include: the power is 300 KW; a clean air is used in the drying process to carry out a great deal of water vapor produced in the drying process, and the clean air is air with dew point controlled at 0° C., the clean air flow is controlled at 800 m$^3$/h), to reduce the moisture content in the beads to 17 wt. %; then, load the beads into a mesh belt furnace for calcination (the calcinating conditions include: temperature: 550-560° C., time: 2.2 h), to obtain matrix beads finally (moisture content: 2.3 wt. %).

(2) Keep the matrix beads in a pre-wetting room at 70-80% RH air humidity, till the moisture content in the matrix beads reaches 19.5 wt. %; then, load the pre-wetted matrix beads into a synthesis reactor to contact with sodium hydroxide solution for crystal transformation (the volume ratio of sodium hydroxide solution to pre-wetted matrix beads is 2.5, the concentration of sodium hydroxide solution is 0.12 mol/L, the contact temperature is 96° C., and the contact time is 3 h), so that most of the binder is transformed into 4A molecular sieves (approx. 80 wt. % binder is transformed into 4A molecular sieve, wherein, the quantity of binder transformed into 4A molecular sieves is deduced from the variation of adsorptive capacity for methanol; for example, if the content of 4A molecular sieves in the powder material is 94 wt. %, the content of binder is 5 wt. %, the content of pore former is 1 wt. %, and the initial adsorptive capacity for methanol of the 4A molecular sieves is 180 mg/g, the increased value of adsorptive capacity after 80 wt. % binder is transformed into 4A molecular sieves will be X=(180*5)*0.8/94=7.66 mg/g), to obtain 4A molecular sieve beads;

(3) Wash the 4A molecular sieve beads with water to remove free sodium ions, and then load the water-washed 4A molecular sieve beads into a column-type reactor to contact with calcium chloride solution for calcium ion exchange, wherein, the concentration of the calcium chloride solution is 0.55 mol/L, the volume ratio of calcium chloride solution to 4A molecular sieve beads is 2, the contact time is 3.5 h, the contact temperature is 95° C., the calcium ion exchange can be repeated for several cycles, till the calcium exchange ratio of 4A molecular sieve beads reaches 90%, to obtain 5A molecular sieve beads; then, wash the 5A molecular sieve beads with water to remove chloride ions, and then carry out microwave drying (the drying conditions include: the power is 300 KW, a clean air is used in the drying process, to carry away a great deal of water vapor produced in the drying process, wherein, the clean air is air with dew point controlled at 0° C., and the clean air flow is controlled at 800 m³/h), to reduce the moisture content in the 5A molecular sieve beads to below 18 wt. %; finally, calcine in a vertical furnace (from Chemical Machinery Works of SINOPEC Nanjing Chemical Industry Co., Ltd.) for dehydration (the volume of the vertical furnace is controlled at 1.8 m³, the height-diameter ratio of the vertical furnace is 1, the clean air temperature in the calcination process is controlled at 550-570° C., the clean air pressure is 2 MPa, the clean air flow is controlled at 2,000 m³/h, the clean air is air with dew point controlled at −25° C., and the calcinating time is 2 h), to obtain 5A molecular sieve bead adsorbent (the moisture content in the adsorbent is 3.5 wt. %; measured on the basis of the dry weight of the adsorbent, the content of 5A molecular sieves is 98 wt. %, the diameter of the adsorbent is 0.3-0.9 mm, and relevant properties of the adsorbent (e.g., adsorptive capacity for n-hexane) are shown in Table 1).

Example 2

Prepare 5A molecular sieve adsorbent beads with the preparation method described in embodiment 1, with the following difference: the average crystal grain diameter of 4A molecular sieve powder used in step (1) is 1.0 μm (the moisture content is 21 wt. %, the adsorptive capacity for methanol is 181 mg/g), and conditions for the matrix bead pre-wetting in step (2) ensure the moisture content in the pre-wetted matrix beads is 22 wt. %; finally obtain 5A molecular sieve bead adsorbent (the moisture content in the adsorbent is 2.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 3

Prepare 5A molecular sieve adsorbent beads with the preparation method described in embodiment 1, with the following difference: the average crystal grain diameter of 4A molecular sieve powder used in step (1) is 0.6 μm (the moisture content is 21 wt. %, the adsorptive capacity for methanol is 181 mg/g), and conditions for the matrix bead pre-wetting in step (2) ensure the moisture content in the pre-wetted matrix beads is 18 wt. %; finally obtain 5A molecular sieve bead adsorbent (the moisture content in the adsorbent is 1.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 4

Prepare 5A molecular sieve adsorbent beads with the preparation method described in embodiment 1, with the following difference: the average crystal grain diameter of 4A molecular sieve powder used in step (1) is 1.7 μm (the moisture content is 21 wt. %, the adsorptive capacity for methanol is 181 mg/g); finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 5

Prepare 5A molecular sieve adsorbent beads with the preparation method described in embodiment 1, with the following difference: the average crystal grain diameter of 4A molecular sieve powder used in step (1) is 0.3 μm (the moisture content is 21 wt. %, the adsorptive capacity for methanol is 181 mg/g); finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 6

Prepare 5A molecular sieve adsorbent beads with the preparation method described in embodiment 1, with the following difference: conditions for the matrix bead pre-wetting in step (2) ensure the moisture content in the pre-wetted matrix beads is 13.6 wt. %; finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 7

Prepare 5A molecular sieve adsorbent beads with the preparation method described in embodiment 1, with the following difference: the 5A molecular sieve beads are dried with an ordinary oven drying method in step (3), and the drying conditions include: 120° C. temperature and 8 h drying time, the moisture content in the 5A molecular sieve beads after drying is reduced to 17 wt. %; finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 8

Prepare 5A molecular sieve adsorbent beads with the preparation method described in embodiment 1, with the following difference: the 5A molecular sieve beads are calcined with an ordinary muffle furnace calcination method in step (3), and the calcination conditions include: 550° C. temperature and 3 h calcination time; finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

Example 9

Prepare 5A molecular sieve adsorbent beads with the preparation method described in embodiment 1, with the following difference: the quantity of 4A molecular sieve powder is 350 kg; finally obtain 5A molecular sieve bead adsorbent (the moisture content in the adsorbent is 3.5 wt. %; measured on the basis of the dry weight of the adsorbent, the content of the 5A molecular sieves is 96 wt. %, the diameter of the adsorbent is 0.3-0.9 mm, and relevant properties of the adsorbent (e.g., adsorptive capacity for n-hexane) are shown in Table 1).

Example 10

Prepare 5A molecular sieve adsorbent beads with the preparation method described in embodiment 1, with the following difference: extrusion forming is used, instead of roll forming; finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 1-2 mm, and relevant properties of the adsorbent (e.g., adsorptive capacity for n-hexane) are shown in Table 1).

Comparative Example 1

Prepare 5A molecular sieve adsorbent beads with the preparation method described in Example 1, with the following difference: crystal transformation is carried out directly without pre-wetting in step (2); finally obtain 5A molecular sieve bead adsorbent (the moisture content in the adsorbent is 3.5 wt. %; measured on the basis of the dry weight of the adsorbent, the content of the 5A molecular sieves is 98 wt. %, the diameter of the adsorbent is 0.3-0.9 mm, and relevant properties of the adsorbent (e.g., adsorptive capacity for n-hexane) are shown in Table 1).

It can be seen from the result in Table 1: the adsorptive capacity for n-hexane of the 5A molecular sieve adsorbent beads obtained with the preparation method disclosed in the present invention is 120 mg/g or higher, preferably 133 mg/g or higher, which is much higher than the adsorptive capacity for n-hexane of 5A molecular sieve adsorbent beads obtained with the preparation method in the prior art; in addition, compared with 5A molecular sieve adsorbent beads obtained with the preparation method in the prior art, the 5A molecular sieve adsorbent beads provided in the present invention have much higher strength. Thus, the 5A molecular sieve adsorbent prepared with the preparation method disclosed in the present invention is especially suitable for use as an adsorbent for n-alkanes.

TABLE 1

| Sample | Average crystal grain diameter of 5A molecular sieve/ μm | Adsorptive capacity for n-hexane (mg n-hexane/g adsorbent) | Breaking ratio at 250N (%) | Total pore volume/ cm³/g |
|---|---|---|---|---|
| Example 1 | 0.72 | 135.1 | 6.6 | 0.35 |
| Example 2 | 1.30 | 133.5 | 6.7 | 0.29 |
| Example 3 | 0.65 | 135.0 | 6.6 | 0.32 |
| Example 4 | 1.72 | 129.7 | 6.8 | 0.28 |
| Example 5 | 0.33 | 129.5 | 7.8 | 0.28 |
| Example 6 | 0.72 | 123.7 | 8.9 | 0.28 |
| Example 7 | 0.72 | 129.1 | 6.8 | 0.29 |
| Example 8 | 0.72 | 128.9 | 6.6 | 0.29 |
| Example 9 | 0.72 | 134.1 | 6.6 | 0.33 |
| Example 10 | 0.72 | 126.9 | 9.0 | 0.26 |
| Comparative Example 1 | 0.72 | 115.5 | 13.9 | 0.25 |

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected domain of the present invention.

In addition, it should be appreciated that the technical features described in the above embodiments can be combined in any appropriate manner, provided that there is no conflict among the technical features in the combination.

Moreover, the different embodiments of the present invention can be combined freely as required, as long as the combinations don't deviate from the ideal and spirit of the present invention. However, such combinations shall also be deemed as falling into the scope disclosed in the present invention.

The invention claimed is:

1. A 5A molecular sieve adsorbent, comprising: 92-99 wt % of a 5A molecular sieve, measured on the basis of a dry weight of the adsorbent, and a binder,
   wherein an average crystal grain diameter of the 5A molecular sieve in the adsorbent is 0.2-2.1 μm, and
   wherein a breaking ratio of the adsorbent at 250 N is 9% or lower.

2. The adsorbent according to claim 1, wherein the weight percentage of the 5A molecular sieve is 96-99 wt %, the average crystal grain diameter of the 5A molecular sieve is 0.5-1.5 μm and the breaking ratio of the adsorbent at 250 N is 4-7%.

3. The adsorbent according to claim 1, wherein the adsorbent is in the form of spherical beads having a diameter of 0.1-1.6 mm.

4. The adsorbent according to claim 1, wherein a total pore volume of the adsorbent is 0.28 cm³/g or greater.

5. The adsorbent according to claim 4, wherein the total pore volume of the adsorbent is 0.29-0.35 cm³/g.

6. The adsorbent according to claim 1, wherein the adsorbent has an adsorptive capacity for n-hexane is 120 mg/g or higher.

7. The adsorbent according to claim 6, wherein the adsorptive capacity for n-hexane is 130-140 mg/g.

8. A method for preparation of 5A molecular sieve adsorbent according to claim 1, comprising:
   (1) processing a powder material comprising 4A molecular sieves and a binder source by roll forming to obtain beads; drying and calcining the beads to obtain matrix beads;
   (2) pre-wetting the matrix beads, and then performing crystal transformation so that the binder in the matrix beads is substantially transformed into 4A molecular sieves to obtain 4A molecular sieve beads; and
   (3) washing the 4A molecular sieve beads with water, and then performing calcium exchange to obtain 5A molecular sieve beads; washing the 5A molecular sieve beads with water and then drying and calcining the 5A molecular sieve beads.

9. The method according to claim 8, wherein a moisture content in the pre-wetted matrix beads is 15 wt. % or higher.

10. The method according to claim 8, wherein the pre-wetting substep in step (2) further comprises: keeping the matrix beads in a humid environment for 1-10 h at a humidity of 10-100% RH.

11. The method according to claim 8, wherein in step (2), 80 wt. % or more binder in the matrix beads is transformed into 4A molecular sieves in the crystal transforming substep.

12. The method according to claim 11, wherein the crystal transformation substep further comprises: contacting the pre-wetted matrix beads with a sodium hydroxide solution of 0.1-0.25 mol/L, at a temperature of 50-150° C. for 1-6 h, wherein a volume ratio of the sodium hydroxide solution to the pre-wetted matrix beads is 1-9:1.

13. The method according to claim 8, wherein the average crystal grain diameter of the 4A molecular sieves in step (1) is 0.2-2.1 µm.

14. The method according to claim 8, wherein the powder material that contains 4A molecular sieves and a binder source in step (1) further contains comprises a pore former, wherein the pore former is one or more materials selected from the group consisting of lignin, sodium carboxymethyl cellulose, and sesbania powder.

15. The method according to claim 14, wherein in the powder material, a content of 4A molecular sieves is 90-99 wt. %, a content of binder source is 0.5-9 wt. %, and a content of pore former is 0.1-8 wt. %.

16. The method according to claim 8, wherein the binder source in step (1) is one or more materials selected from the group consisting of Kaolin, Yangkan clay, and diatomite.

17. The method according to claim 8, wherein, in step (3), after water washing, the 5A molecular sieve beads are dried by microwave and a moisture content in the dried 5A molecular sieve beads is 18 wt. % or lower.

18. The method according to claim 8, wherein, in step (3), the 5A molecular sieve beads is calcined in an air flow at 1-5 MPa, and a moisture content in the calcined 5A molecular sieve beads is 5 wt. % or lower, and the air has a dew point in a range of 50° C. to −50°.

19. The method according to claim 8, wherein, in step (3), the calcium exchange substep comprises contacting the water-washed 4A molecular sieve beads with a calcium chloride solution of 0.1-1.2 mol/L at 50-150° C. for 1-16 h, and wherein a volume ratio of calcium chloride solution to the water-washed 4A molecular sieve beads is 1-9:1.

20. The adsorbent according to claim 3, wherein the diameter of the spherical beads is 0.3-1.3 mm.

* * * * *